US007406034B1

(12) United States Patent
Cometto et al.

(10) Patent No.: US 7,406,034 B1
(45) Date of Patent: Jul. 29, 2008

(54) METHODS AND APPARATUS FOR FIBRE CHANNEL FRAME DELIVERY

(75) Inventors: Maurilio Cometto, San Jose, CA (US); Scott S. Lee, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1106 days.

(21) Appl. No.: 10/114,568

(22) Filed: Apr. 1, 2002

(51) Int. Cl.
*H04L 12/28* (2006.01)
*G01R 31/08* (2006.01)

(52) U.S. Cl. .................. 370/218; 370/389; 370/395.31; 370/254

(58) Field of Classification Search ................. 370/400, 370/394, 389, 392, 230, 235, 238, 395.1, 370/395.4, 468, 253, 412, 413, 252, 218, 370/216; 709/238, 400
See application file for complete search history.

(56) References Cited

U.S. PATENT DOCUMENTS

| | | | | |
|---|---|---|---|---|
| 5,428,471 | A | | 6/1995 | McDermott |
| 5,506,838 | A | | 4/1996 | Flanagan |
| 5,617,421 | A | | 4/1997 | Chin et al. |
| 5,675,741 | A | | 10/1997 | Aggarwal et al. |
| 5,682,479 | A | | 10/1997 | Newhall et al. |
| 5,708,659 | A | * | 1/1998 | Rostoker et al. ............ 370/392 |
| 5,740,159 | A | | 4/1998 | Ahmad et al. |
| 5,740,171 | A | | 4/1998 | Mazzola et al. |
| 5,742,604 | A | | 4/1998 | Edsall et al. |
| 5,764,636 | A | | 6/1998 | Edsall |
| 5,809,285 | A | | 9/1998 | Hilland |
| 5,818,603 | A | | 10/1998 | Motoyama |
| 5,862,125 | A | * | 1/1999 | Russ .......................... 370/228 |
| 5,959,972 | A | | 9/1999 | Hamami |
| 5,964,841 | A | * | 10/1999 | Rekhter ...................... 709/242 |
| 5,999,930 | A | | 12/1999 | Wolff |
| 6,035,105 | A | | 3/2000 | McCloghrie et al. |
| 6,046,985 | A | | 4/2000 | Aldred |
| 6,101,497 | A | | 8/2000 | Ofek |
| 6,188,668 | B1 | | 2/2001 | Brewer et al. |
| 6,188,694 | B1 | | 2/2001 | Fine et al. |
| 6,202,135 | B1 | | 3/2001 | Kedem et al. |
| 6,205,488 | B1 | | 3/2001 | Casey et al. |
| 6,208,623 | B1 | | 3/2001 | Rochberger et al. |

(Continued)

FOREIGN PATENT DOCUMENTS

EP 0 772 121 A 5/1997

(Continued)

OTHER PUBLICATIONS

EPC Search Report dated Feb. 10, 2006, Application No. 03 746-053.2—2416.

(Continued)

*Primary Examiner*—Hanh Nguyen
(74) *Attorney, Agent, or Firm*—Weaver Austin Villeneuve & Sampson LLP

(57) ABSTRACT

Methods and apparatus are provided for improving fibre channel frame delivery. Techniques are provided for the in order delivery of frames by intelligently delaying or dropping selected fibre channel frames. Other techniques are provided for in order delivery by using label switching and frame labels. The various techniques can be applied during circumstances such as a link state or channel change.

21 Claims, 13 Drawing Sheets

U.S. PATENT DOCUMENTS

| | | | | |
|---|---|---|---|---|
| 6,208,649 | B1 | 3/2001 | Kloth | |
| 6,209,059 | B1 | 3/2001 | Ofer et al. | |
| 6,219,699 | B1 | 4/2001 | McCloghrie et al. | |
| 6,226,771 | B1 | 5/2001 | Hilla et al. | |
| 6,260,120 | B1 | 7/2001 | Blumenau et al. | |
| 6,262,977 | B1 | 7/2001 | Seaman et al. | |
| 6,266,705 | B1 | 7/2001 | Ullum et al. | |
| 6,269,381 | B1 | 7/2001 | St. Pierre et al. | |
| 6,269,431 | B1 | 7/2001 | Dunham | |
| 6,295,296 | B1 | 9/2001 | Tappan | |
| 6,295,575 | B1 | 9/2001 | Blumenau et al. | |
| 6,330,614 | B1 | 12/2001 | Aggarwal et al. | |
| 6,337,861 | B1 | 1/2002 | Rosen | |
| 6,388,995 | B1 | 5/2002 | Gai et al. | |
| 6,408,001 | B1 | 6/2002 | Chuah et al. | |
| 6,426,952 | B1 | 7/2002 | Francis et al. | |
| 6,438,612 | B1 | 8/2002 | Ylonen et al. | |
| 6,473,421 | B1 | 10/2002 | Tappan | |
| 6,493,349 | B1 | 12/2002 | Casey | |
| 6,529,963 | B1 | 3/2003 | Fredin et al. | |
| 6,532,212 | B1 * | 3/2003 | Soloway et al. | 370/230 |
| 6,597,663 | B1 * | 7/2003 | Rekhter | 370/252 |
| 6,604,407 | B2 | 8/2003 | Kano | |
| 6,661,773 | B1 * | 12/2003 | Pelissier et al. | 370/228 |
| 6,674,760 | B1 | 1/2004 | Walrand et al. | |
| 6,728,220 | B2 | 4/2004 | Behzadi | |
| 6,728,848 | B2 | 4/2004 | Tamura et al. | |
| 6,775,230 | B1 * | 8/2004 | Watanabe et al. | 370/228 |
| 6,804,776 | B1 | 10/2004 | Lothberg et al. | |
| 6,848,007 | B1 | 1/2005 | Reynolds et al. | |
| 6,859,435 | B1 * | 2/2005 | Lee et al. | 370/231 |
| 6,879,560 | B1 * | 4/2005 | Cahn | 370/230.1 |
| 6,904,053 | B1 * | 6/2005 | Berman | 370/466 |
| 6,915,358 | B2 | 7/2005 | Horton et al. | |
| 6,920,133 | B1 | 7/2005 | Boodaghians | |
| 6,920,154 | B1 | 7/2005 | Achler | |
| 6,947,379 | B1 * | 9/2005 | Gleichauf et al. | 370/229 |
| 6,959,151 | B1 * | 10/2005 | Cotter et al. | 398/54 |
| 6,975,589 | B2 | 12/2005 | Luft et al. | |
| 6,985,490 | B2 | 1/2006 | Czeiger et al. | |
| 7,006,525 | B1 | 2/2006 | Jha | |
| 7,026,288 | B2 | 4/2006 | Judice et al. | |
| 7,027,406 | B1 | 4/2006 | Shabtay et al. | |
| 7,046,679 | B2 | 5/2006 | Sampath | |
| 7,050,392 | B2 * | 5/2006 | Valdevit | 370/228 |
| 7,061,858 | B1 | 6/2006 | Di Benedetto et al. | |
| 7,072,298 | B2 | 7/2006 | Paul et al. | |
| 7,079,544 | B2 | 7/2006 | Wakayama et al. | |
| 7,082,140 | B1 | 7/2006 | Hass | |
| 7,085,846 | B2 | 8/2006 | Jenne et al. | |
| 7,155,494 | B2 | 12/2006 | Czeiger et al. | |
| 7,206,288 | B2 | 4/2007 | Cometto et al. | |
| 2001/0049739 | A1 | 12/2001 | Wakayama et al. | |
| 2002/0101868 | A1 | 8/2002 | Clear et al. | |
| 2002/0110125 | A1 | 8/2002 | Banks et al. | |
| 2002/0150039 | A1 | 10/2002 | Valdevit | |
| 2002/0156918 | A1 | 10/2002 | Valdevit et al. | |
| 2002/0156924 | A1 | 10/2002 | Czeiger et al. | |
| 2002/0176434 | A1 | 11/2002 | Yu et al. | |
| 2002/0188754 | A1 | 12/2002 | Foster et al. | |
| 2003/0012204 | A1 | 1/2003 | Czeiger et al. | |
| 2003/0016624 | A1 | 1/2003 | Bare | |
| 2003/0101239 | A1 | 5/2003 | Ishizaki | |
| 2003/0118053 | A1 | 6/2003 | Edsall et al. | |
| 2003/0145116 | A1 | 7/2003 | Moroney et al. | |
| 2003/0149848 | A1 | 8/2003 | Ibrahim et al. | |
| 2003/0163727 | A1 | 8/2003 | Hammons et al. | |
| 2003/0189929 | A1 | 10/2003 | Matsuzaki et al. | |
| 2004/0100910 | A1 | 5/2004 | Desai et al. | |
| 2004/0151174 | A1 | 8/2004 | Del Signore et al. | |
| 2004/0230787 | A1 | 11/2004 | Blumenau et al. | |
| 2005/0018701 | A1 | 1/2005 | Dropps et al. | |
| 2005/0036499 | A1 | 2/2005 | Dutt et al. | |
| 2005/0108444 | A1 | 5/2005 | Flauaus et al. | |
| 2005/0117562 | A1 | 6/2005 | Wrenn | |
| 2006/0034302 | A1 | 2/2006 | Peterson | |
| 2006/0087963 | A1 | 4/2006 | Jain et al. | |
| 2006/0092932 | A1 | 5/2006 | Ghosh et al. | |
| 2006/0159081 | A1 | 7/2006 | Dropps | |

FOREIGN PATENT DOCUMENTS

| | | |
|---|---|---|
| EP | 1134938 | 9/2001 |
| EP | 1187406 | 3/2002 |
| WO | WO 00/31925 | 6/2000 |
| WO | WO 01/19027 | 3/2001 |
| WO | WO 01/95565 | 12/2001 |
| WO | WO 02/71224 | 12/2002 |

OTHER PUBLICATIONS

Ezio Valdevit, Fabric Shortest Path First Version 2 (FSPF), Revision 0.2, Brocade, pp. 1-32, May 23, 2000.

RE: FCIP/iFCP: Guarantee In-Order delivery for FC N/NL_ports, http://www.pdl.cmu/edu/mailinglists/ips/mail/msg03069.html, Sep. 4, 2001.

White Paper: "Optimizing the performance and management of 2 Gbit/sec SAN fabrics with ISL trunking", Brocade, pp. 2-7.

Network working group, RFC 3031, Category: Standards Track, E. Rosen Cisco Systems, Inc., A Viswanathan Force 10 Networks, Inc., R. Callon Juniper Networks, Inc. Jan. 2001, Multiprotocol Label Switching Architecture, pp. 1-52.

Listanti et al., "Architectural and Technologicl Issues for Future Optical Internet Networks", IEEE Communication Magazine, Sep. 2000.

EPO Search report dated May 19, 2005, Application No. 03 746062.3 -1249.

Brocade Communication Systems, Inc.: "Increasing intelligence within the SAN fabric", White Paper, Online!, Jun. 2001, pp. 2-6, XP002251362.

Brocade Communication Systems, Inc.: "Optimizing the performance and management of 2 Gbit/sec SAN fabrics with ISL trunking", White Paper, Online!, Mar. 2002, pp. 2-6, XP002251363.

E. Rosen, A. Wiswanathan, R. Callon: "Multiprotocol Label Switching Architecture", Network Working Group, Request for Comments: 3031, Category: Standards Track, Online! Jan. 2001, pp. 1-52, XP002251364.

Molero X et al.: "On the effect of link failures in fibre channel storage area networks", Parallel Architectures, Algorithms and Networks 2000, I-Span 2000, Proceedings, International Symposium on Dallas, TX, USA, Dec. 7-9, 2000, Los Alamitos, CA, USA, IEEE.

Ezio Valdevit: "Fabric shortest path first version (FSPF), Rev. 0.2", Fabric Shortest Path, XX, XX, May 23, 2000, pp. 2-31.

VenKat Rangan: "Re: FCIP/1FCP : Guarantee In-Order delivery for FC N/NL_ports", IP Storage—Mailing List Archive, Online! Sep. 4, 2001, pp. 1-4, XP002251361 IP Storage—Mailing List Archive.

International Search Report, PCT/US 03/09328 mailed Oct. 17, 2003, 5 pages.

Final Office Action Mailed Apr. 4, 2007, U.S. Appl. No. 10/114,349.

Chinese First Office Action, Chinese Patent Application No. 03807600.4, issued Sep. 8, 2006.

Cometto et al., Notie of Allowance for U.S. Appl. No. 10/170,855.

Desanti (Oct. 2004), "Extended_Headers," VF N_Port Model T11/04-627v1, 1 page.

Desanti (Oct. 2004), "Virtual Fabrics N_Port Support," VF N_Support, T11/04-494v2, 14 pages.

Desanti (Oct. 2004), "Virtual Fabrics Switch Support", VF Switch Support, T11/04-395v3, 15 pages.

Desanti (Apr. 2003), "Virtual Fabrics," T11/03-220v0, 11 pages (Microsoft PowerPoint presentation).

Desanti (Jul. 2004), "Virtual Fabrics N_Port Support," VF N_Support, T11/04-49v0, 13 pages.

Desanti et al. (May 2003), "Tagged Frame Specification," Tagged Frame Spec., T11/03-353v0, 4 pages.

Guan et al. (May 30, 2003), "Inter-fabric FC Architecture," Brocade—The Intelligent Platform for Network Storage.
Lee et al. (4/12002), "Label Switching in Fibre Channel Networks," U.S. Appl. No. 10/114,394.
Listanti et al. (Sep. 2000), "Architectural and Technological Issues for Future Optical Internet Networks," Optical Solutions for Next-Generation Internet Networks, IEEE Communication Magazine.
Mearian et al., "What's After Fibre Channel?," Computer World (webprint), XP002246206.
Molero et al. (Dec. 7-9, 2000), "On the effect of link failure in fibre channel storage area networks," Parallel Architectures, Algorithms and Networks 2000, I-Span 2000 Proceedings, Int'l Symposium.
Monia (Dec. 12, 2000), "iFCP- A Protocol for Internet Fibre Channel Storage Networking" Nishan Systems (webprint), P002246205.
NCITS (Nov. 29, 2000), "Fibre Channel Generic Services-3 (FC-GS-3)," working draft.
"Fibre Channel Switch Fabric-2 (FC-SW-2)", NCITS Working draft, Jun. 26, 2001.
NCITS (Feb. 19, 2003), "Fibre Channel Switch Fabric-3 (FC-SW-3)," working draft (XP002300830 (A,B,C)).
Rajagopal et al. (Jun. 30, 1999), "IP and ARP Over Fibre Channel," Request for Comments: 2625 (webprint), XP002246207.
Valdevit (May 23, 2000), "Fabric Shortest Path First Version (FSPF) Rv. 0.2", Fabric Shortest Path (http://t11.org./index.htm webprint), XP002959525.
White (Sep. 2000), RFC 2925, IBM Corp.
Brocade Communication Systems, Inc. (2002-2003), "Optimizing the performance and management of 2Gbit/sec SAN fabrics with ISL trunking," White Paper (webprint).
Brocade Communication Systems, Inc. (Jun. 2001), "Increasing Intelligence with the SAN Fabric," White Paper (webprint), XP002251362.
Cisco Systems, Inc. (1992-2003), "Cisco MDS 9000 Family of Multilayer Directors and Fabric Switches," pp. 1-4.
Commetto et al., Allowed Claims for U.S. Appl. No. 10/170,855.
Armitage (Jan. 2000), "MPLS: The Magic Behind the Myths," IEEE Communications Magazine, pp. 124-131, (XP000908346).
Fabric Shortest Path First (FSPF) Project 1508-D Switch Fabric -3 Rev. 6.5, (http://t11/org/index.htm webprint), pp. 117-140 (Oct. 31, 2003).
AU Office Action (May 23, 2007) from AU Patent Application No. 2003226093.
AU Office Action dated May 30, 2007 from AU Patent Application No. 2003226022.
EP Office Action (Apr. 5, 2006) from EP Patent Application No. 03739 127.3—2416.
EP Search Report (Feb. 10, 2006) from EP Patent Application No. 03746053.2 -2416.
EP Search Report (Mar. 28, 2007) from EP Patent Application No. 03746053.2 -2416.
US Office Action (Oct. 17, 2006) from U.S. Appl. No. 10/114,394.
US Office Action (Dec. 13, 2005) from U.S. Appl. No. 10/034,160.
US Office Action (Feb. 23, 2007) from U.S. Appl. No. 10/430,491.
US Office Action (Feb. 5, 2007) from U.S. Appl. No. 10/034,160.
US Office Action (Apr. 4, 2007) from U.S. Appl. No. 10/114,394.
U.S. Office Action dated (Aug. 22, 2007) from related U.S. Appl. No. 10/114,394.
US Office Action (May 22, 2006) from U.S. Appl. No. 10/170,855.
US Office Action (May 31, 2006) from U.S. Appl. No. 10/034,160.
US Office Action (Jul. 30, 2007) from U.S. Appl. No. 10/034,160.
US Office Action (Aug. 22, 2005) from U.S. Appl. No. 10/034,160.
U.S. Office Action (Sep. 26, 2006) from related U.S. Appl. No. 10/034,160.
WO Search Report (Oct. 17, 2003) from International Patent Application No. PCT/US03/09328.
WO Search Report (Oct. 25, 2006) from International Patent Application No. PCT/US05/37763.
WO Search Report (Oct. 27, 2004) from International Patent Application No. PCT/US2004/020518.
WO Search Report (May 23, 2003) from International Patent Application No. PCT/US02/41072.
WO Search Report (Jul. 15, 2003) from International Patent Application No. PCT/US03/09442.
WO Written Opinion (Oct. 25, 2006) from International Patent Application No. PCT/US05/37763.
U.S. Office Action dated Mar. 28, 2007 from related U.S. Appl. No. 10/791,143.
Cisco Systems, "Cisco SAN-OS Reference Guide", 1992-2004 Cisco Systems, Inc. pp. 1-13.
Cisco Systems, "Cisco SAN-OS", 1992-2003 Cisco Systems, Inc. pp. 1-7.
PCT International Search Report mailed Jul. 12, 2004 from PCT Application No. PCT/US03/36452.
D. Mills, Network Working Group Request for Comments 1059, Network Time Protocol (Version 1) Specification and Implementation, University of Delaware, Jul. 1988, pp. 1-50.
International Search Report mailed Nov. 4, 2003 from related PCT Application No. PCT/US03/18765 3 pages.
Lee et al., "Label Switching in Fibre Channel Networks" U.S. Appl. No. 10/114,394, filed Apr. 1, 2002.
Final Office Action, U.S. Appl. No. 10/609,442, mailed Sep. 5, 2007.
China Office Action dated Oct. 19, 2007, China Application No. 200480010826.0.
EP Office Action dated Oct. 1, 2007, EP Application No. 03746053.2.
CA Office Action, Canadian Application No. 2,487,071, dated Nov. 15, 2006.
EP Office Action, Application No. 03789766.7, mailed Nov. 6, 2007.
Australian Office Action dated Mar. 16, 2007 from related AU Application No. 2002364204.
U.S. Appl. No. 10/974,368, Office Action mailed Sep. 10, 2007.
U.S. Appl. No. 11/027,252, Office Action mailed Oct. 29, 2007.

* cited by examiner

Figure 3A

| | Routing Table For Switch 101 | |
|---|---|---|
| | Destination Identifier | Set Of Next Hops |
| 303 | Switch 101 | Processor |
| 305 | Switch 103 | Switch 103 |
| 307 | Switch 105 | Switch 105 |
| 309 | Switch 107 | Switch 105 |
| 311 | Switch 109 | Switch 105 |
| | 315 | 317 |

Figure 3B

| | Updated Routing Table For Switch 101 | |
|---|---|---|
| | Destination Identifier | Updated Set Of Next Hops |
| 323 | Switch 101 | Processor |
| 325 | Switch 103 | Switch 103 |
| 327 | Switch 105 | Switch 105 |
| 329 | Switch 107 | Switch 103<br>Switch 105 |
| 331 | Switch 109 | Switch 103<br>Switch 105 |
| | 335 | 337 |

Figure 8A

| Forwarding Channel Table For Switch 107 | | |
|---|---|---|
| | Next Hop | Links |
| 803 | 109 | Link 701, 703, and 705 |
| 805 | ... | ... |
| | 807 | 809 |

Figure 8B

| Updated Forwarding Channel Table For Switch 107 | | |
|---|---|---|
| | Next Hop | Links |
| 813 | 109 | Link 701, 703, 705, and 707 |
| 815 | ... | ... |
| | 817 | 819 |

1014

| LSR4 Routing Table | | | |
|---|---|---|---|
| In Label | Dest Id | Nxt Hop | Out Label |
| 410 | 1 | 1 | 110 |
| 420 | 2 | 2 | 220 |
| 430 | 3 | 3 | 330 |
| 440 | 4 | cpu | - |
| 450 | 5 | 1 | 150 |
| | | 2 | 250 |
| | | 3 | 350 |

1015

| LSR5 Routing Table | | | |
|---|---|---|---|
| In Label | Dest Id | Nxt Hop | Out Label |
| 510 | 1 | 1 | 110 |
| 520 | 2 | 2 | 220 |
| 530 | 3 | 3 | 330 |
| 540 | 4 | 1 | 140 |
| | | 2 | 240 |
| | | 3 | 340 |
| 550 | 5 | cpu | - |

1011

| LSR1 Routing Table | | | |
|---|---|---|---|
| In Label | Dest Id | Nxt Hop | Out Label |
| 110 | 1 | cpu | - |
| 120 | 2 | 4 | 420 |
| | | 5 | 520 |
| 130 | 3 | 4 | 430 |
| | | 5 | 530 |
| 140 | 4 | 4 | 440 |
| 150 | 5 | 5 | 550 |

1012

| LSR2 Routing Table | | | |
|---|---|---|---|
| In Label | Dest Id | Nxt Hop | Out Label |
| 210 | 1 | 4 | 410 |
| | | 5 | 510 |
| 220 | 2 | cpu | - |
| 230 | 3 | 4 | 430 |
| | | 5 | 530 |
| 240 | 4 | 4 | 440 |
| 250 | 5 | 5 | 550 |

1013

| LSR3 Routing Table | | | |
|---|---|---|---|
| In Label | Dest Id | Nxt Hop | Out Label |
| 310 | 1 | 4 | 410 |
| | | 5 | 510 |
| 320 | 2 | 4 | 420 |
| | | 5 | 520 |
| 330 | 3 | cpu | - |
| 340 | 4 | 4 | 440 |
| 350 | 5 | 5 | 540 |

1114 LSR4 Routing Table

| In Label | Dest Id | Nxt Hop | Out Label |
|---|---|---|---|
| 410,411 | 1 | 1,2 | 110,? |
| | | 1,3 | 110,? |
| 420,421 | 2 | 2 | 220,? |
| 430,431 | 3 | 3 | 330,? |
| 440,441 | 4 | cpu | - |
| 450,451 | 5 | 2 | 250,? |
| | | 3 | 350,? |

1115 LSR5 Routing Table

| In Label | Dest Id | Nxt Hop | Out Label |
|---|---|---|---|
| 510 | 1 | 1 | 110 |
| 520 | 2 | 2 | 220 |
| 530 | 3 | 3 | 330 |
| 540 | 4 | 1 | 140 |
| | | 2 | 240 |
| | | 3 | 340 |
| 550 | 5 | cpu | - |

1111 LSR1 Routing Table

| In Label | Dest Id | Nxt Hop | Out Label |
|---|---|---|---|
| 110,111 | 1 | cpu | - |
| 120,121 | 2 | 5 | 520 |
| 130,131 | 3 | 5 | 530 |
| 140,141 | 4 | 4,5 | 440,? |
| 150,151 | 5 | 5 | 550 |

1112 LSR2 Routing Table

| In Label | Dest Id | Nxt Hop | Out Label |
|---|---|---|---|
| 210 | 1 | 4 | 410 |
| | | 5 | 510 |
| 220 | 2 | cpu | - |
| 230 | 3 | 4 | 430 |
| | | 5 | 530 |
| 240 | 4 | 4 | 440 |
| 250 | 5 | 5 | 550 |

1113 LSR3 Routing Table

| In Label | Dest Id | Nxt Hop | Out Label |
|---|---|---|---|
| 310 | 1 | 4 | 410 |
| | | 5 | 510 |
| 320 | 2 | 4 | 420 |
| | | 5 | 520 |
| 330 | 3 | cpu | - |
| 340 | 4 | 4 | 440 |
| 350 | 5 | 5 | 540 |

1214

| LSR4 Routing Table | | | |
|---|---|---|---|
| In Label | Dest Id | Nxt Hop | Out Label |
| 410,411 | 1 | 1,2 | 110,211 |
| | | 1,3 | 110,311 |
| 420,421 | 2 | 2 | 220,221 |
| 430,431 | 3 | 3 | 330,331 |
| 440,441 | 4 | cpu | - |
| 450,451 | 5 | 2 | 250,251 |
| | | 3 | 350,351 |

1215

| LSR5 Routing Table | | | |
|---|---|---|---|
| In Label | Dest Id | Nxt Hop | Out Label |
| 510,511 | 1 | 1 | 110,111 |
| 520,521 | 2 | 2 | 220,? |
| 530,531 | 3 | 3 | 330,? |
| 540,541 | 4 | 1 | 140,141 |
| | | 2 | 240,? |
| | | 3 | 340,? |
| 550,551 | 5 | cpu | - |

1211

| LSR1 Routing Table | | | |
|---|---|---|---|
| In Label | Dest Id | Nxt Hop | Out Label |
| 110,111 | 1 | cpu | - |
| 120,121 | 2 | 5 | 520,521 |
| 130,131 | 3 | 5 | 530,531 |
| 140,141 | 4 | 4,5 | 440,441 |
| 150,151 | 5 | 5 | 550,551 |

1212

| LSR2 Routing Table | | | |
|---|---|---|---|
| In Label | Dest Id | Nxt Hop | Out Label |
| 210,211 | 1 | 4 | 410,411 |
| | | 5 | 510,? |
| 220,221 | 2 | cpu | - |
| 230,231 | 3 | 4 | 430,431 |
| | | 5 | 530,? |
| 240,241 | 4 | 4 | 440,441 |
| 250,251 | 5 | 5 | 550,? |

1213

| LSR3 Routing Table | | | |
|---|---|---|---|
| In Label | Dest Id | Nxt Hop | Out Label |
| 310,311 | 1 | 4 | 410,411 |
| | | 5 | 510,? |
| 320,321 | 2 | 4 | 420,421 |
| | | 5 | 520,? |
| 330,331 | 3 | cpu | - |
| 340,341 | 4 | 4 | 440,441 |
| 350,351 | 5 | 5 | 550,? |

METHODS AND APPARATUS FOR FIBRE CHANNEL FRAME DELIVERY

CROSS-REFERENCE TO RELATED APPLICATIONS

The present application is related to concurrently filed U.S. patent application Ser. No. 10/114,394 by Scott S. Lee and Dinesh G. Dutt and titled Label Switching In Fibre Channel Networks, the entirety of which is incorporated by reference for all purposes.

BACKGROUND OF THE INVENTION

1. Field of the Invention

The present invention relates to fibre channel networks. More specifically, the present invention relates to methods and apparatus for providing in order delivery of fibre channel frames in a fibre channel network during circumstances such as changes in link state or changes in channel state.

2. Description of Related Art

Many conventional network protocols allow the out of order delivery of a packet sequence. A network node in a TCP/IP based network can receive an out of order set of packets and reorder the packets upon receipt. Packets often arrive out of order if they travel along different paths to reach a destination.

However, some fibre channel devices such as disks, disk arrays, and other storage mechanisms can not handle out of order frames. Link and channel state changes are some of the circumstances that may cause out of order delivery of frames in a fibre channel fabric. Multiple links seen as a single link between two fibre channel entities is referred to herein as a channel. Some mechanisms in existing networks call for the flushing of all frames in the network upon a change in link state. Flushing all of the frames can prevent out of order delivery when paths and routes change in a network. All frames are flushed even if the paths for the frames to the associated destinations are not changed. However, flushing all of the frames either explicitly or implicitly can be very disruptive to network operation, as more frames are dropped than is necessary and network operation is at least temporarily halted.

It is therefore desirable to provide methods and apparatus for improving fibre channel frame delivery and providing in order delivery particularly during link state and channel changes.

SUMMARY OF THE INVENTION

Methods and apparatus are provided for improving fibre channel frame delivery. Techniques are provided for the in order delivery of frames by intelligently delaying or dropping selected fibre channel frames. Other techniques are provided for in order delivery by using label switching and frame labels. The various techniques can be applied during circumstances such as a link or channel state change.

According to various embodiments, a method for selectively delivering fibre channel frames in a fibre channel fabric is provided. A set of next hops at a fibre channel entity is identified. The set of next hops is used to forward frames based on a destination identifier. A fibre channel fabric link change is detected. An updated set of next hops is identified. The updated set of next hops is used to forward a frame received at a fibre channel entity based on a destination identifier while accounting for the fibre channel fabric link change. The set of next hops is compared to the updated set of next hops. The forwarding of frames towards the updated set of next hops is prevented for a predetermined period of time if it is determined that the set of next hops is different from the updated set of next hops.

According to another embodiment, a method for selectively delivering frames in a fibre channel fabric is provided. A channel for forwarding frames from a first fibre channel entity to a second fibre channel entity is identified. The channel comprises a plurality of links connecting the first fibre channel entity to the second fibre channel entity. A change in the channel is detected at the first fibre channel entity. An updated channel for forwarding frames from the first fibre channel entity to the second fibre channel entity is identified. The updated channel is different from the channel. Frames received for forwarding on the updated channel that have not yet been placed into output queues associated with the updated channel are blocked.

In yet another embodiment, a method for selectively delivering frames in a fibre channel fabric is provided. A fibre channel fabric link change is detected at a fibre channel switch. An updated routing table associated with a topology version number is generated. Generating an updated routing table includes determining a next hop, an incoming label, and a destination corresponding to each entry in the updated routing table. A frame is received at the fibre channel switch. The frame includes a first destination and a first label corresponding to a first entry in the updated routing table. It is determined whether the fibre channel switch has received a first outgoing label corresponding to the first entry in the updated routing table, the received first outgoing label having the same topology version number as the updated routing table. The frame is dropped if it is determined that the fibre channel switch has not received the first outgoing label.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which are illustrative of specific embodiments of the present invention.

FIG. 3A is a diagrammatic representation of a routing table showing a set of next hops FIG. 3B is a diagrammatic representation of a routing table showing an updated set of next hops.

FIG. 8A is a diagrammatic representation of a forwarding channel table.

FIG. 8B is a diagrammatic representation of an updated forwarding channel table.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

Methods and apparatus of the present invention provide for in order delivery of fibre channel frames. According to various embodiments, several network conditions can lead to the out of order delivery of frames to fibre channel device. The techniques of the present invention provide for delaying, blocking, dropping, and/or labeling certain fibre channel frames to deliver frames to a fibre channel device in order. In one embodiment, frames that will be traversing a new path are blocked to allow frames travelling along the old path to either reach the destination first or be dropped from the network.

Figure 1:
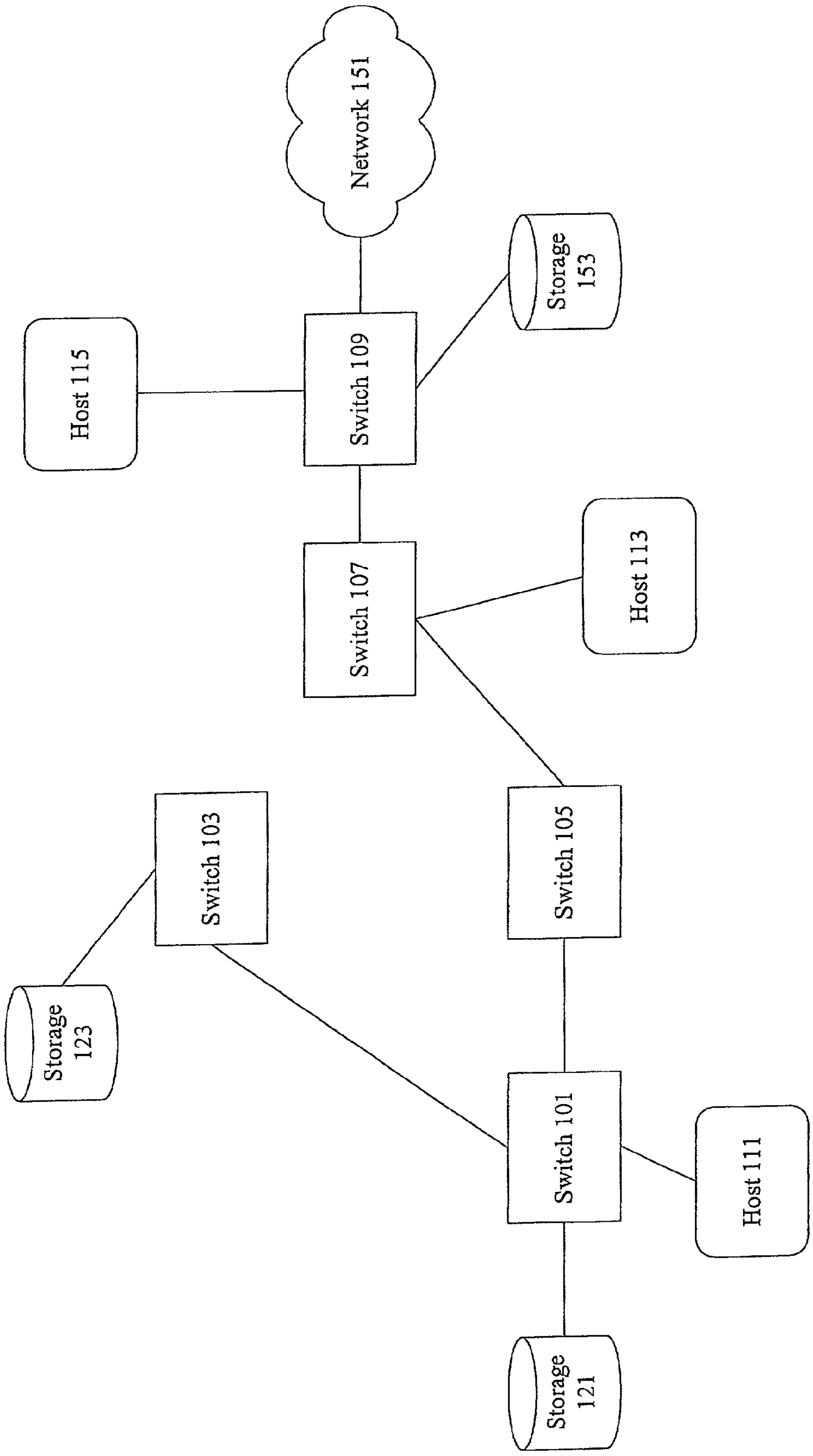
FIG. 1 is a diagrammatic representation of a network that can use the techniques of the present invention.

FIG. 1 is a diagrammatic representation of one example of a network that can use the techniques of the present invention. FIG. 1 shows a storage area network implemented using fibre channel. A switch 101 is coupled to switches 103 and 105 as well as to a host 111 and storage 121. In one embodiment, host 111 is a server or client system while storage 121 is any storage subsystem such as a single disk or a redundant array of independent disks (RAID). Switch 105 is coupled to switch 107. Switch 107 is connected to host 113 and switch 103 is connected to storage 123. Switch 109 is connected to host 115, switch 107, host 153, and an external network 151 that may or may not use fibre channel. In order for a host 111 to access network 151, a path going through switch 105 can be used. It should be noted that any apparatus including a processor, memory, and a connection to a fibre channel fabric can be a fibre channel switch.

Ports used to connect switches to each other in a fibre channel network are referred to herein as non F-ports while ports used to connect a switch to a host a referred to herein as F-ports. In one example, non F-ports are used to connect switch 105 to switch 107 while F-ports are used to connect switch 107 to host 113. Similarly, FL-ports are used to connect switch 103 to storage 123. Ports such as F-ports and FL-ports are herein referred to as edge ports. Other ports are referred to as non-edge ports.

According to various embodiments, a frame transmitted from host 111 to a network 151 or to a storage device 153 includes parameters such as the exchange identifier, a sequence, and a sequence number. The exchange identifier can provide information on what exchange the frame belongs to. The sequence can provide information on what portion of the exchange the frame belongs to while the sequence number can provide information on how the frames should be ordered. Sequence numbers can be used to allow for in order delivery of fibre channel frames.

Some fibre channel devices such as certain storage disks and disk arrays require that frames be received in the order in which they were transmitted. Conventional networks such as TCP/IP networks do not have such a requirement, as TCP/IP networks generally have mechanisms for reordering packets upon receipt. If frames with sequence numbers of 191, 192, and 193 are transmitted in order in a fibre channel network, a fibre channel device receiving the frames may expect that the frames are in the same order in which they were transmitted. A fibre channel device may not be able to handle receiving the frames out of order.

In a static fibre channel network, frames will typically be received in the order in which they were transmitted. However, several occurrences can lead to the out of order delivery of fibre channel frames. Links state changes in particular can lead to out of order delivery.

Figure 2:
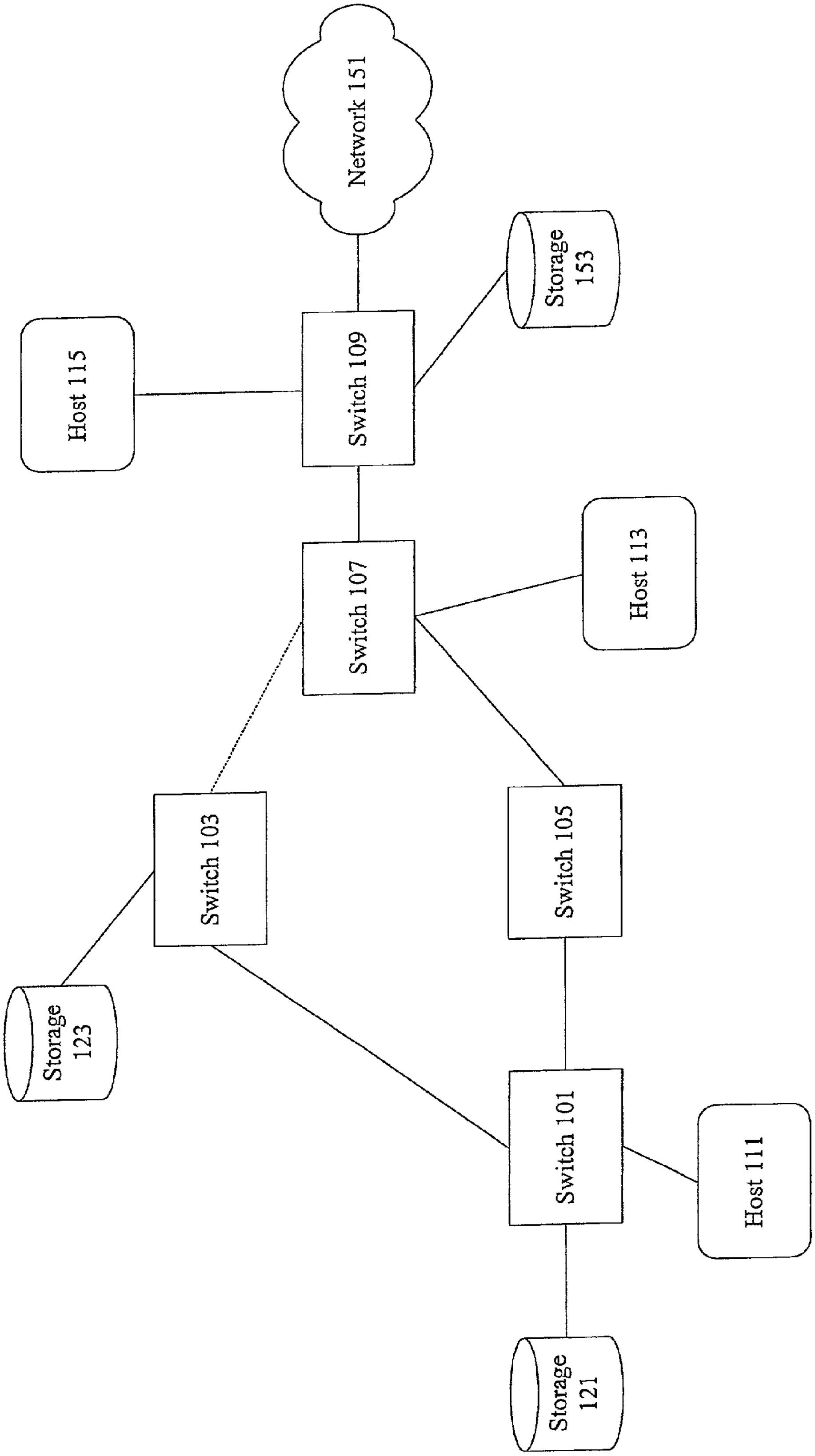
FIG. 2 is a diagrammatic representation of a fibre channel fabric undergoing a fibre channel fabric link change.

FIG. 2 is a diagrammatic representation of a fibre channel fabric undergoing a fibre channel fabric link change. FIG. 2 shows one example of a link change that can lead to out of order delivery of fibre channel frames. A new link using non edge-ports is introduced between switch 103 and switch 107. With the introduction of a new link between switch 103 and switch 107, a new version of the routing tables can be generated. A variety of routing table generation algorithms such as Fibre Channel Shortest Path First (FSPF) can be used. Traffic from host 111 travelling through switches 101, 105, and 107 to switch 109 now can travel through switches 101, 103, and 107 to switch 109. The set of next hops available to transmit frames from a switch 111 to a storage device 153 is switch 105 before the introduction of the new link.

A set of neighboring fibre channel entities available to transmit a frame from one fibre channel entity to another fibre channel entity is referred to herein as a set of next hops. After a link change, a set of next hops can be updated in a switch. In one example, the set of next hops for transmitting frames from switch 101 to a network 151 changes from simply switch 105 to both switch 103 and switch 105 after link state change. A set of neighboring entities that can be used to transmit frames from a source to a destination updated after a link change or the generation of updated routing tables is referred to herein as an updated set of next hops. It should be noted that a set of next hops can include one or more neighboring nodes. In one example, a set of next hops is a single neighboring entity. In another example, a set of next hops includes multiple neighboring entities.

Having an updated set of next hops can lead to out of order delivery of fibre channel frames. In one example, the earlier frames transmitted at switch 101 in a sequence may be travelling through switch 105 while later frames in the same sequence may be travelling through a switch 103. A variety of network conditions can cause the later frames travelling through a switch 103 to arrive at switch 109 before the earlier frames travelling through a switch 105 arrive at switch 109. In one example, the earlier frames are slowed at a switch 105 because of congestion at switch 105 while the later frames travel through switch 103 quickly because of a new high bandwidth link between switch 103 and switch 107. A storage device 153 receiving the later transmitted frames before receiving the earlier transmitted frames from host 111 may not be able to handle the out of order frames.

FIGS. 3A and 3B depict routing tables showing information relating to sets of next hops and updated sets of next hops at a switch 101. FIG. 3A shows sets of next hops for a frame received at switch 101 and a network where a link has not yet been established between switch 103 and switch 107. When a frame is received at switch 101, an identifier depicting the destination of the frame can be used to reference an entry in the routing table. In one example, the destination of the frame is switch 107 and the entry 309 can be referenced to determine that the set of next hops is switch 105. If it is determined that the destination of the received frame is switch 101, the routing table can be used to pass the frame to a processor associated with switch 101. A routing table can also be used to drop frames. In one example, a value such as a null value can be placed in the set of next hops and a frame having a destination associated with the null value can be dropped upon referencing a routing table. An entry directing that a frame with a particular destination be dropped is referred to herein as an adjacency drop.

In one embodiment, a routing table is provided for each virtual storage area network (VSAN) that the switch is a part of. It should be noted that a fibre channel switch can be a part of many different VSANs and a routing table can be provided for each VSAN the switch is associated with.

After a link is added connecting switch 103 to switch 107, the routing table is updated. FIG. 3B is a diagrammatic representation of a routing table showing updated sets of next hops. According to various embodiments, a frame having a destination set as switch 107 can be forwarded along either switch 103 or switch 105 based on entry 329. In a stable topology, all frames in a particular flow or exchange follow the same path.

It should be noted that a routing table may allow both paths or it can select a best path. If the best path selected has a next hop of switch 105 the updated set of next hops is the same as the set of next hops before the link change as shown in FIG. 3A. If the path selected is switch 103 for a frame with a destination of switch 107, the updated set of next hops is different from the set of next hops in the routing table before the link change. Determining whether an updated set of next hops is different from an original set of next hops can be useful for deciding on whether to block or drop a particular frame. In one example, frames are not blocked or dropped if the path for a particular sequence of frames remains unchanged even after a link change in the fibre channel fabric. If the path for the sequence of frames remains the same, the frames will be delivered in order to a destination. If the path for the sequence of frames has changed, there is risk that frames will be delivered out of order.

Figure 4:
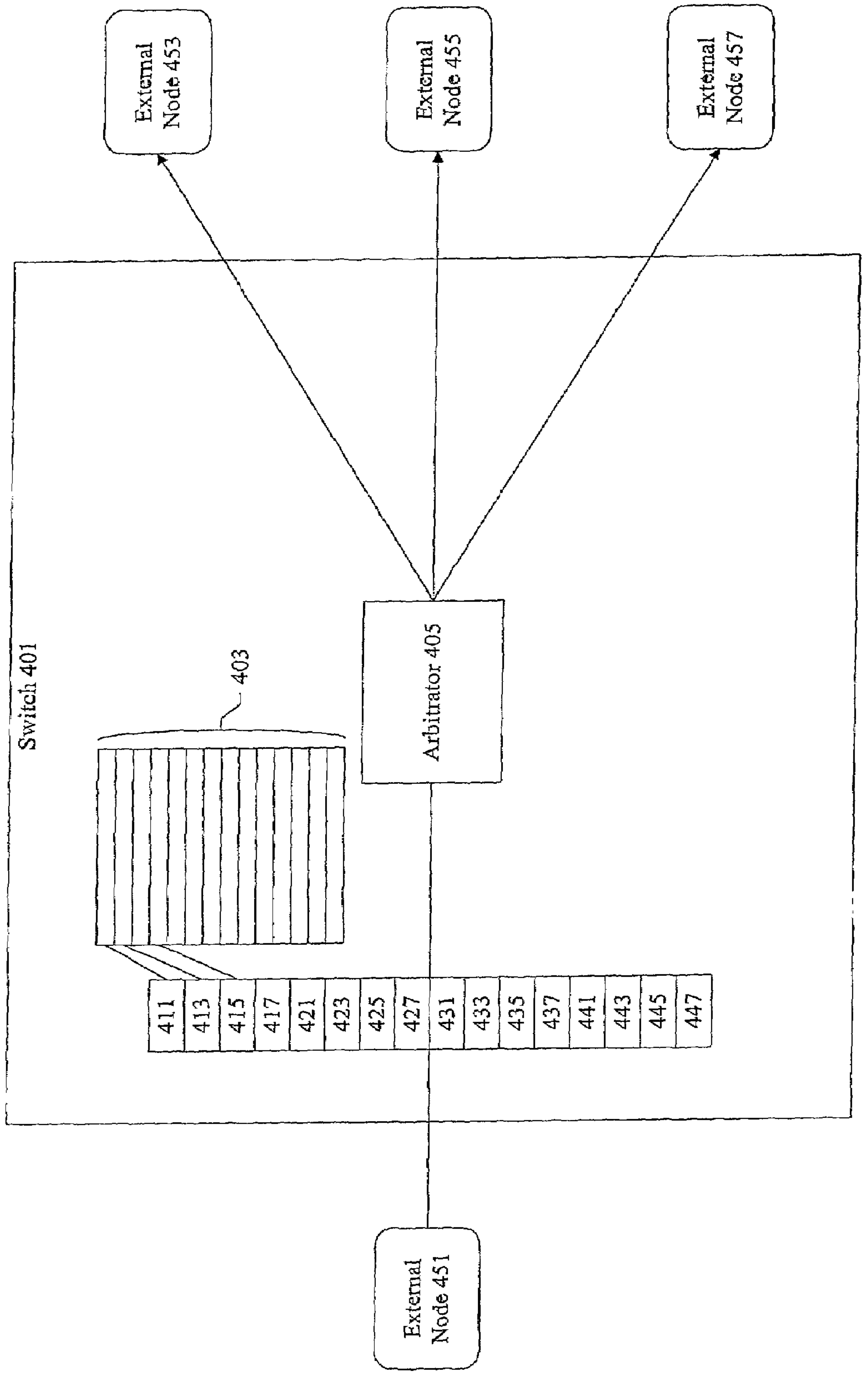
FIG. 4 is a diagrammatic representation showing virtual output queues.

One of the mechanisms that can impact the order in which fibre channel frames are delivered are the queues within a fibre channel switch. A frame transmitted first from a host can remain in a queue associated with a switch 105 while a frame transmitted later from a host can be delivered quickly through a switch 103. FIG. 4 is a diagrammatic representation of queues that can be associated with a fibre channel switch, according to various embodiments. Although one particular type of queue will be described, it should be noted that a variety of different input and output queues associated with various input and output ports can be used to implement the techniques of the present invention.

A switch 401 is connected to external nodes 451, 453, 455, and 457. The switch 401 includes a buffer 403 of shared memory associated with each switch port. A buffer 403 is associated with external node 451. Buffers associated with external nodes 453, 455, and 457 are not shown for purposes of clarity. The buffer 403 can hold traffic destined for external nodes 453, 455, 457, and loop back traffic to external node 451.

In typical implementations, frames destined for the various external nodes are all placed in the same buffer 403. Consequently, when a switch 401 receives a large volume of frames destined for a particular node such as external node 453, frames associated with external node 453 can use the entire buffer 403. According to various embodiments, the frames stored in buffer 403 are referenced by pointers in frame descriptor queues 411-447. Each frame descriptor can contain a pointer or reference identifying where the frame is stored in the buffer 403. Pointers or references to a shared buffer are herein referred to as descriptors. Descriptors can also identify other information such as frame priority.

In one example, an arbitrator 405 selects frames using a round-robin methodology. In a first round, a frame destined for external node 453 is selected. In a second round, a frame destined for external node 455 is selected, etc. More particularly, the arbitrator 405 may first select a high priority frame associated with descriptor 411 destined for external node 453, then select a high priority frame associated with descriptor 421 destined for external node 455, then select a high priority frame associated with descriptor 431 destined for external node 457, etc. It should be noted that a variety of techniques for selecting a frame can be used, as will be appreciated by one of skill in the art.

A queuing system having buffers apportioned based on destination is referred to herein as virtual output queuing (VOQ). VOQ is described further in Tamir Y., Frazier G.: "High Performance multi-queue buffers for VLSI communications switches", Proc. Of 15th Ann. Symp. On Comp. Arch., pp.343-354, June 1988, the entirety of which is incorporated by reference for all purposes. An abstraction identifying traffic with particular characteristics between two nodes is herein referred to as a flow. In one example, a flow is referenced by a source identifier, a destination identifier, a priority, a class, and an exchange identifier. Other characteristics are also possible. It should be noted, however, that a flow may also be referenced merely by a source and destination identifier.

According to various embodiments, frames in a particular flow may be blocked because a buffer 403 is full. If an alternative route is provided for frames in the same sequence, later frames may be able to traverse a fibre channel fabric more quickly than a frame remaining in a congested switch. In one implementation, later frames can be blocked along an alternative route to allow earlier frames to reach a destination first. Frames transmitted first are herein referred to as earlier frames while frames transmitted later by a source are referred to herein as later frames. Later frames can be blocked using several mechanisms. In one embodiment, the arbitrator 405 may simply not select frames of the sequence for transmission to external nodes. In another embodiment, the later frames may not be queued for transmit scheduling at all until a period of time has elapsed.

The period of time can be determined in several manners. According to various embodiments, a fibre channel switch is configured to buffer a frame for no more than a fibre channel switch latency before the frame is dropped. It should be noted, however, that some switches may not drop a frame after a fibre channel switch latency has elapsed. In one embodiment, if the frame is held in a buffer in the switch for more than a latency period, a frame is dequeued from the virtual output queue and dropped. The fibre channel switch latency may depend on switching speeds and network congestion. The amount of time the frame can spend in a fibre channel switch before being dropped is referred to herein as the fibre channel switch latency.

The amount of time a frame can spend in a fibre channel network before being dropped is referred to herein as the fibre channel fabric drain latency or network drain latency. According to various embodiments, the fibre channel fabric drain latency or network drain latency is calculated by multiplying the fibre channel switch latency by the maximum number of hops it takes for a frame to traverse the fibre channel fabric. A wide variety of techniques for determining fibre channel switch latency and fibre channel fabric drain latency are contemplated.

Figure 5:
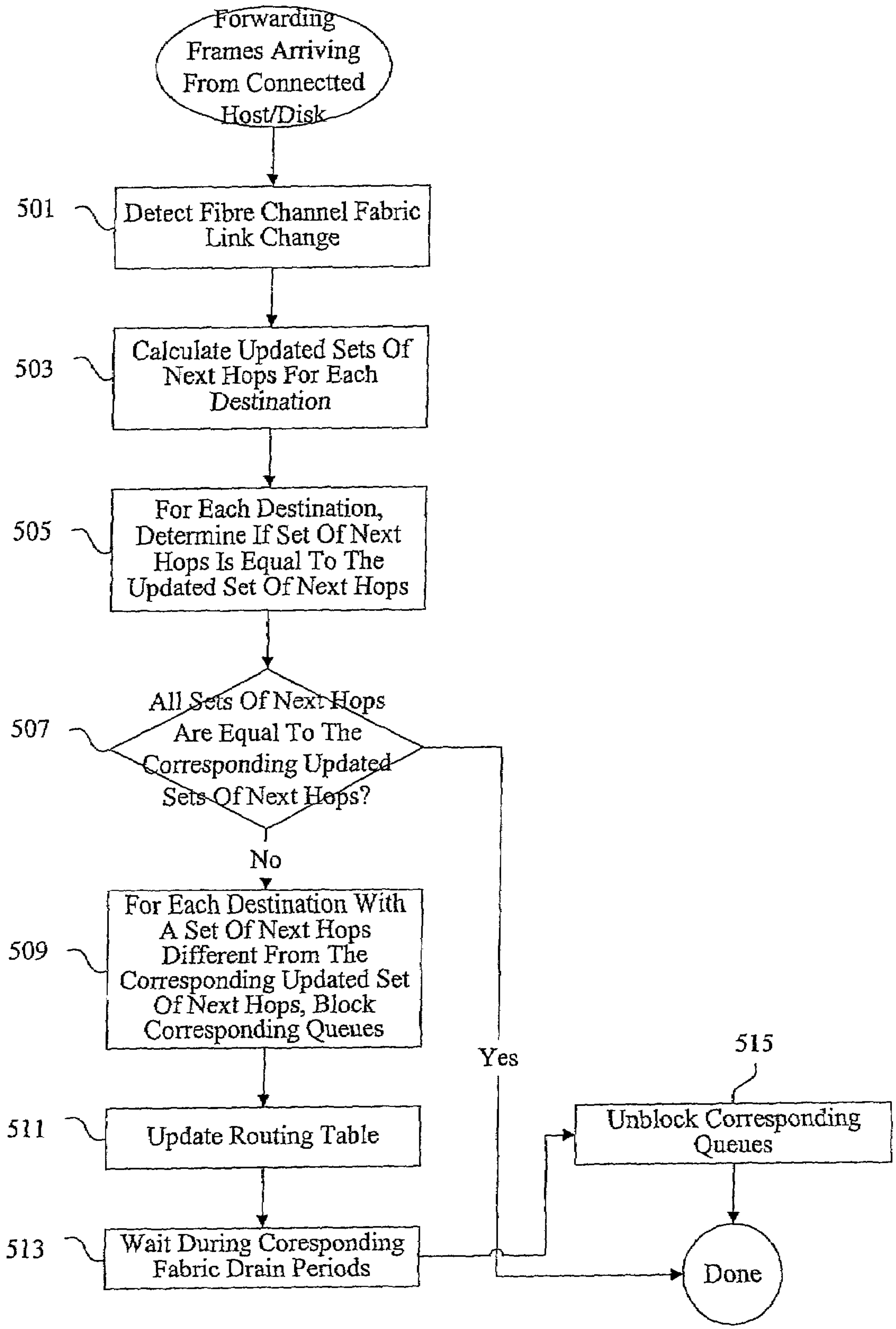
FIG. 5 is a process flow diagram showing the blocking of fibre channel frames.

FIG. 5 is a process flow diagram showing the forwarding of frames arriving from a connected host or disk. At 501, a fibre channel fabric link change is detected. As noted above, the fibre channel fabric link change can lead to the out of order delivery of a frame sequence to a fibre channel device. According to various embodiments, A fibre channel fabric link change can be detected based on the receipt of link update messages or the transmission of link update messages. At 503, updated sets of next hops are generated for each destination based on the new link state information. The updated set of next hops can be generated using algorithms such as Fibre Channel Shortest Path First (FSPF). With new information about network topology, a switch may better be able to determine what is the best path for transmitting a frame to a particular destination. At 505, it is determined for each destination whether the set of next hops is equal to the updated set of next hops. If it is determined at 507 that all sets of next hops are equal to the corresponding updated sets of next hops, no action is taken.

For example, if the original path for transmitting a frame to a destination was through switches 103 and 107 while the new path for transmitting a frame to a destination is also through switches 103 and 107, no action is necessary. However, if the updated path for transmitting a frame to a destination is 105 and 107, the updated set of next hops is not equivalent to be original set of next hops. Blocking and dropping mechanisms can be applied. At 509, for each destination with a set of next hops different from the corresponding updated set of next hops, the queues or virtual output queues for transmission of a frame having that destination are blocked. According to various embodiments, blocking the virtual output queue may entail not transmitting the frame to a next hop. At 511, the routing table is updated using the updated sets of next hops. The queues with a change in the set of next hops can then be blocked during a fabric drain latency or fabric drain period at 513.

The fabric drain latency allows time for earlier packets that may still remain at congested network switches to either be delivered or dropped from the network. Different fabric drain periods may be associated with each virtual output queue or a single fabric drain period can be applied to all the virtual output queues. After a fabric drain period has elapsed, the blocked queues are unblocked at 515. Later frames in the blocked queues can now be transmitted since earlier frames were either dropped or delivered to the destination. Later frames can be transmitted to a destination without the risk that earlier transmitted frames are still in the network waiting to arrive at the destination out of order.

The techniques described in FIG. 5 can be applied at any port in a fibre channel fabric on a per VSAN, per destination basis. According to various embodiments, however, the techniques depicted in FIG. 5 are applied at an edge-ports connecting a switch to a host or disk. The techniques for edge-ports focus on blocking traffic to avoid injecting traffic which will potentially be dropped.

Figure 6:
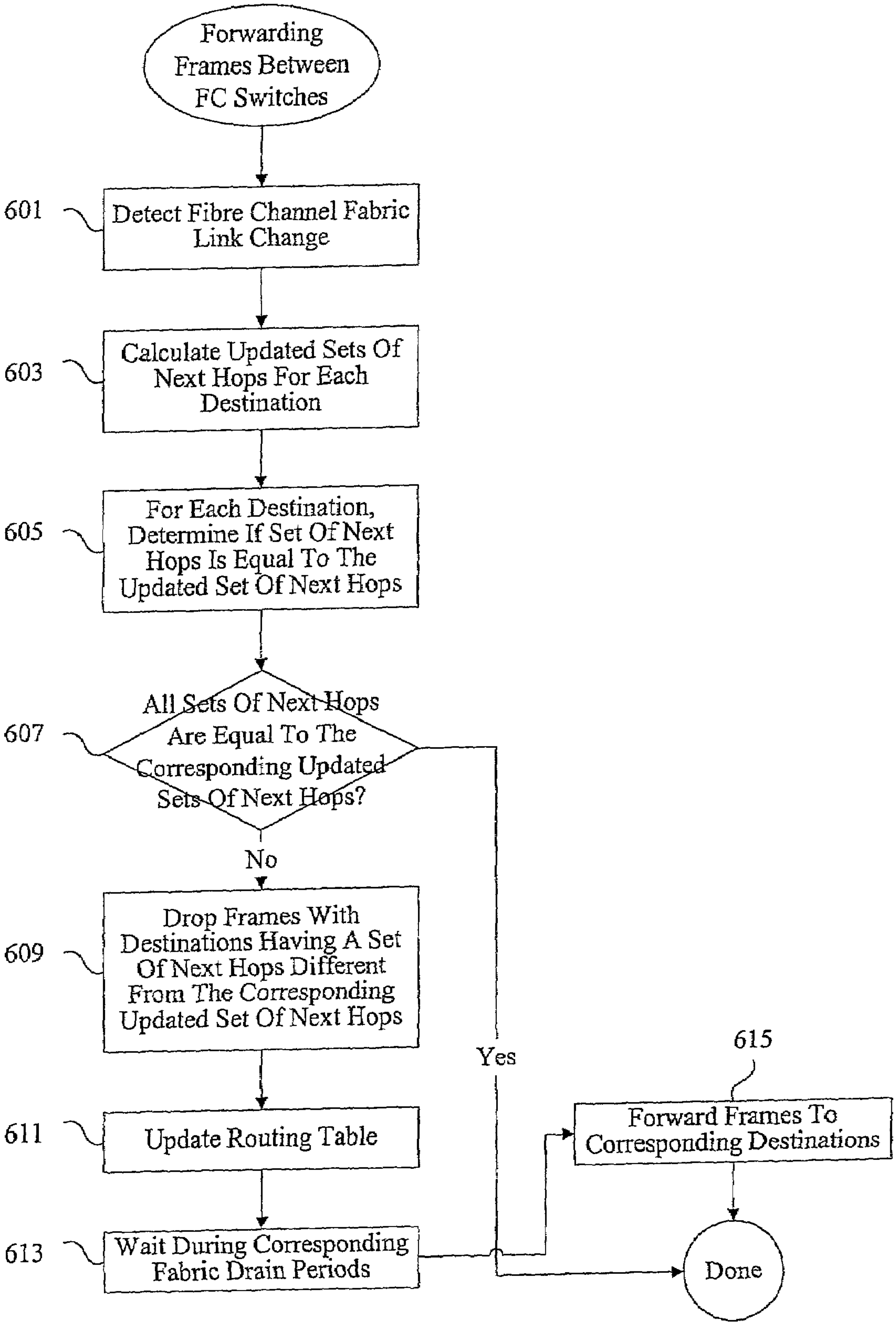
FIG. 6 is a process flow diagram showing the dropping of fibre channel frames.

FIG. 6 is a process flow diagram showing the forwarding of frames between fibre channel switches. At 601, the fibre channel fabric link change is detected. At 603, updated sets of next hops are calculated for each destination. At 605, it is determined for each destination if the set of next hops is equal to the updated set of next hops. If all sets of next hops are equal to the corresponding updated sets of next hops at 607, no action needs to be taken. If the sets of next hops are not equal to all the corresponding updated sets of next hops, frames having destinations associated with a changed set of next hops are dropped at 609.

The routing table can be updated at 611 and the fibre channel switch waits for a corresponding fabric drain period associated with the virtual output queue at 613. After the fabric drain period has elapsed for a particular queue, frames that would be placed in the queue associated with a fabric drain period are now forwarded instead of being dropped.

As noted above, the techniques of the present invention can apply towards the in order delivery of fibre channel frames in a fibre channel fabric upon detection of a link change. Typically, when a new node or new link is added or an old node or an old link is subtracted from the fibre channel topology, there is a risk of out of order delivery of fibre channel frames.

However, changes in network topology are not the only events that can trigger out of order delivery. Changes in a channel between two switches can also lead to out of order frame delivery.

Figure 7:
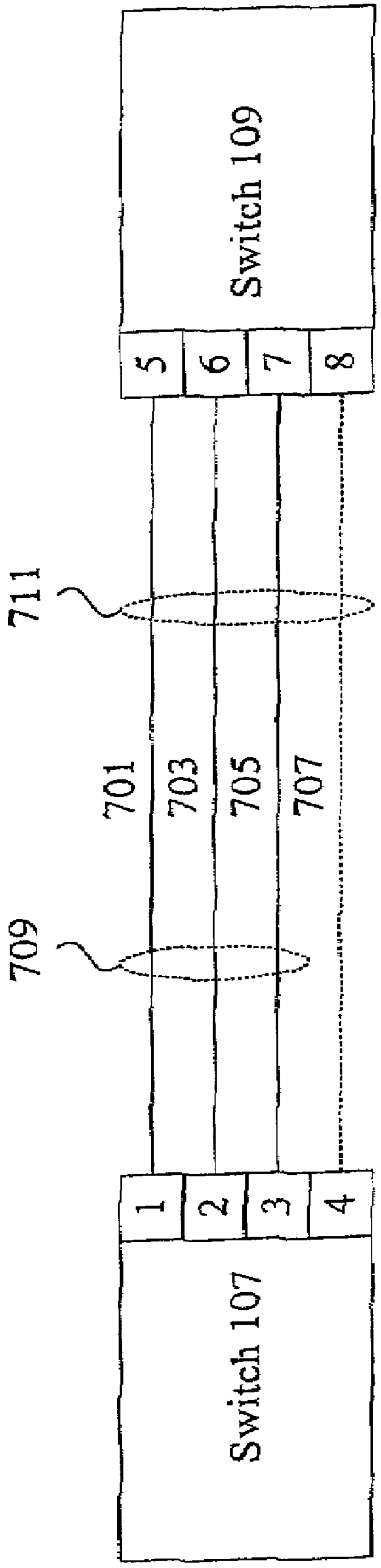
FIG. 7 is a diagrammatic representation of possible reordering at a channel.

FIG. 7 is a diagrammatic representation showing a channel change that can cause out of order delivery. Switches 107 and 109 may be interconnected originally through redundant links 701, 703, and 705 that form a channel 709. Traffic traveling between switches 107 and 109 may be distributed across the different links in the channel 709 based on factors such as fairness and load balancing. In another example, identical hash functions can be used at the transmitting and receiving switches to determine what link to access next. Using identical hash functions can provide for in order delivery.

When a new link 707 is added to form an updated channel 711, more links are now available for transmission between switch 107 and switch 109. It should be noted, however, that no change in network topology occurs. Switches 107 and 109 are still connected in the fibre channel fabric. According to various embodiments, no changes or updates to routing tables are necessary when a channel changes. The routing table may simply instruct that a frame be forwarded from switch 107 to switch 109. The forwarding from switch 107 to switch 109 is not affected by the addition of a new link 707 to the original channel 709 to form the updated channel 711.

However, adding a link to a channel can also cause out of order delivery of fibre channel frames. Using the example above where frames with sequence numbers 1-6 are being transmitted on link 701, 703, or 705, a frame with sequence numbers 7 and 8 may be transmitted along link 707. A link 707 may be an uncongested or a higher bandwidth link that allows the frames with sequence numbers 7 and 8 to leave switch 109 before the frames 1-6 arrive. The techniques of the present invention provide for the blocking and dropping fibre channel frames to allow in order delivery to switches and nodes downstream of switch 109. Blocking is also herein referred to as delaying.

As noted above, when a channel changes, the routing table may not necessarily change as a link still exists between switch 107 and switch 109. Logic and mechanisms for determining what links are available in a channel for transmitting a frame are referred to herein as forwarding channel tables. It should be noted that forwarding channel tables may change. FIG. 8A shows a forwarding channel table for a switch 107. For a next hop 109, entry 803 provides that links 701,703, and 705 can be used to transmit a frame from switch 107 to the next hop 109.

FIG. 8B shows a forwarding channel table for a switch 107 after a change in channel. After a change in the channel occurs, entry 813 provides information that links 701,703, 705, and 707 can be used to transmit from a switch 107 to a next hop 109.

Figure 9:
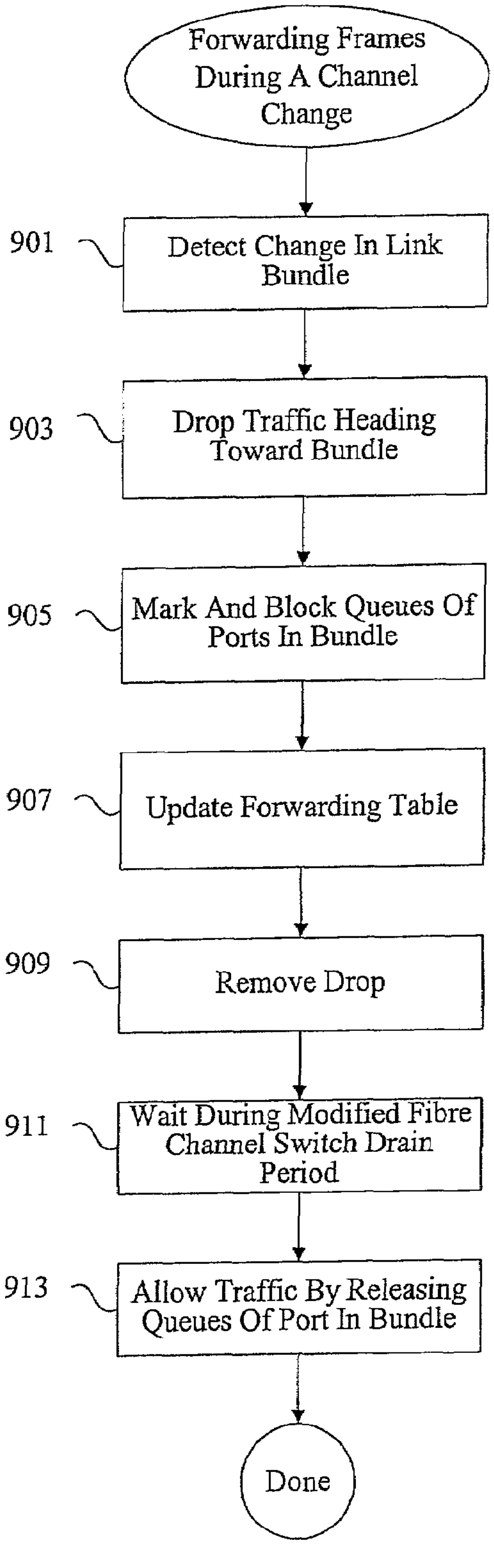
FIG. 9 is a process flow diagram showing the forwarding of fibre channel frames upon a change in the channel.

FIG. 9 is a process flow diagram showing the forwarding the frames during a channel change, according to various embodiments. At 901, a switch detects a change in the channel. The addition or subtraction of one or more links can be a change in the channel. At 903, traffic directed toward the channel based on the routing table next hop is dropped. In one embodiment, traffic destined for transmission through the channel but not yet queued is dropped to allow changes in the forwarding channel tables to accommodate the channel change. However, traffic already queued remains. As noted above, the traffic already queued may reside in virtual output queues associated with particular flows. At 905, the queues for transmitting along the links in the channel are marked and blocked. In one example, marking and blocking the queues includes allowing all frames already in the queues to be transmitted while blocking any new frames for the switch drain latency time period.

At 907, a forwarding channel table can then be updated to add and/or remove links in the channel. At 909, traffic heading toward the channel that was previously dropped at 903 can now be allowed into the queues. A switch can then wait at 911 during a modified fibre channel switch drain latency. According to various embodiments, a modified fibre channel switch drain latency is longer than the standard fibre channel switch drain latency to allow all frames already in the queues to be transmitted instead of dropped. At 913, queues associated with the links in the channel are released and all frames in the queues are either transmitted or dropped if the frame is too old and new frame sequences can now be delivered in order.

Although mechanisms such as delaying frames can be used according to various embodiments, the techniques of the present invention also contemplate using labels to provide for in order delivery of fibre channel frames. One of the many reasons for using labels is that labels provide a fast mechanism for accessing entries in a routing table. Instead of looking at a destination address, the destination identifier can be an "in label" or an incoming label that can be used to quickly reference a routing table entry. Labels can be used for a variety of other reasons as well. Using labels in fibre channel networks is described in concurrently filed U.S. application Ser. No. 10/114,394, titled Label Switching In Fibre Channel Networks by inventors Scott S. Lee and Dinesh G. Dutt, the entirety of which is incorporated by reference for all purposes. One example of an architecture for implementing label switching is Multiple Protocol Label Switching (MPLS) described in RFC 3031, the entirety of which is also incorporated by reference for all purposes.

Figure 10:
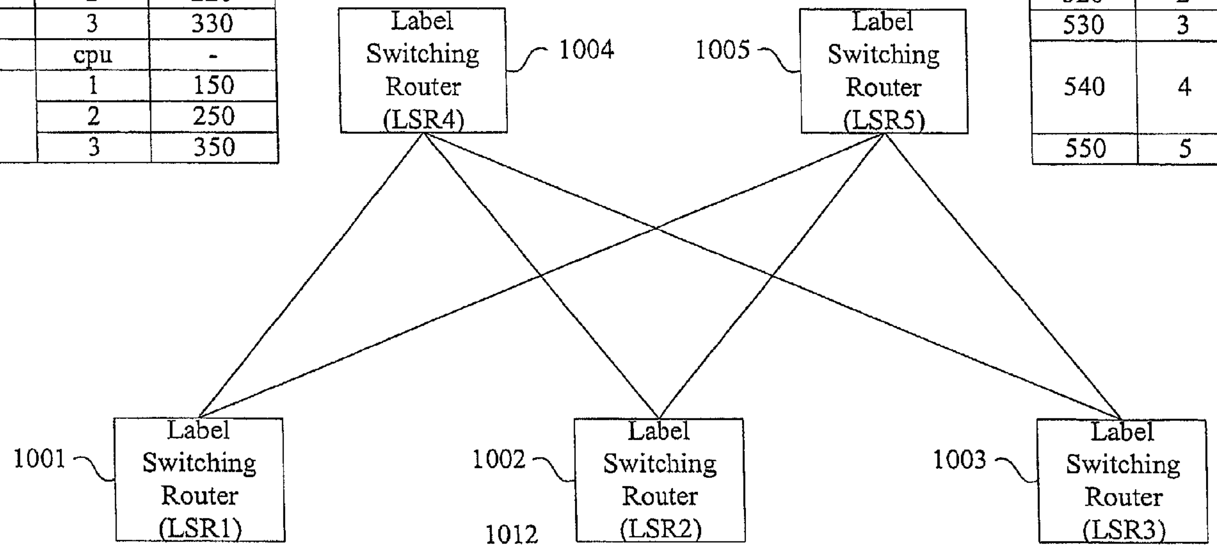
FIG. 10 is a diagrammatic representation of label switching routers.

FIG. 10 is a diagrammatic representation of a fibre channel network including label switching routers that can forward packets based on labels associated with frames. In addition to containing the destination address, a frame includes as a destination identifier an in label also referred to herein as an incoming label that allows a switch to quickly access an entry in a routing table. For example, a label switching router 1004 can receive a frame with a destination of 2 and an in label of 420. It should be noted that in FIGS. 10-12, a destination or a next hop of 1-5 refers to a switch 1001-1005. The label switching router 1004 can access its routing table 1014 to recognize that the next hop is label switching router 1002 and the "out label" should be 220. The out label is also referred to herein as an outgoing label. According to various embodiments, the label switching router 1004 replaces the frame label value of 420 corresponding to the in label in the routing table with a frame label of 220 corresponding to the out label in the routing table 1014.

By replacing the label value, the label switching router 1004 provides label information to the next hop router 1002, to allow the label switching router 1002 to similarly access a routing table entry quickly. It should be noted that although label switching can be provided for fast access of entries in a routing table, label switching can be used for a variety of reasons. The techniques of the present invention provide that frames can be delivered in order by using labels.

When a label switching router 1002 receives a frame from label switching router 1004, the label switching router uses the label 220 to access an entry in the routing table 1012. Using the in label 220, the label switching router 1002 recognizes that the frame has reached the ultimate hop switch and no longer needs to be forwarded to another switch. The frame can then be forwarded to the ultimate destination which may be a host or a disk.

A variety of techniques can be used for generating routing tables with labels. In one embodiment, routing tables are generated upon the receipt of link state update packets under the FSPF protocol. Routing tables can be generated periodically or upon the identification of a change in link state. According to various embodiments, a newly generated routing table is associated with an incarnation number. A combination of all the incarnation numbers in a fibre channel fabric is herein referred to as a topology version number. In one embodiment, every time a new routing table is generated at a switch, the incarnation number is incremented by one. According to various embodiments, each label switching router in a fibre channel network not only generates new forwarding routes toward each destination, but each label switching router also generates new in labels different from the previous set of in labels.

Figure 11:
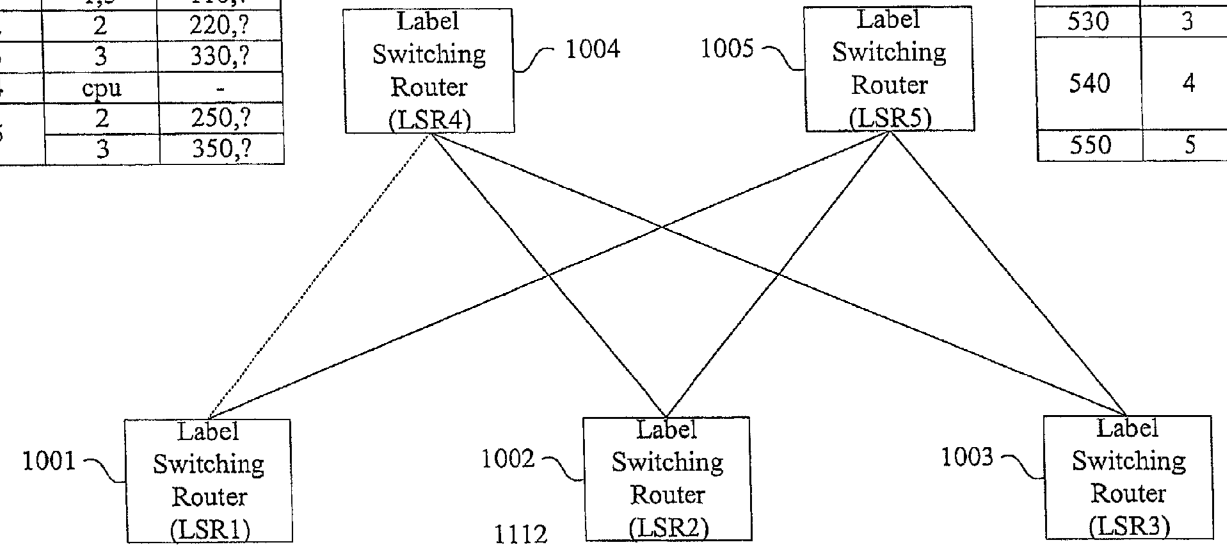
FIG. 11 is a diagrammatic representation of label switching routers during a link change.

FIG. 11 is a diagrammatic representation showing label switching routers during a change in link state. Here, the link between label switching router 1004 and label switching router 1001 is no longer available. Link state update packets or link state records are propagated throughout the fibre channel fabric. To transmit to a label switching router 1001 from a label switching router 1004, label switching router 1004 can no longer forward directly to label switching router 1001. Instead, label switching router 1004 sends frames towards either label switching router 1002 or label switching router 1003. The new routes are reflected in the routing table 1114. The label switching router 1004 generates a new routing table 1114 with the new set of next hops and generates a new in label 411 replacing the old in label 410.

According to various embodiments, the label switching router 1004 sends label switching control messages to the other label switching routers in the fibre channel fabric in order to remove the outdated 410 in label. The label switching control messages sent to other label switching routers in the fibre channel fabric include a topology version number. In one embodiment, the other label switching routers verify that the topology version number of the label switching control messages matches the topology version number of the routing tables. If the topology version number of the label switching control message does not match the topology version number of the routing table in a particular label switching router or if the control message contains an older version number, the label switching control message is discarded.

If the topology version number of the label switching control message is newer than the topology version number of the routing table in a particular label switching router, the label switching control message can be stored and used later when the newer version of the routing table is available.

If the topology version numbers match, the label switching router receiving the label switching control message can remove the outdated label. For example, if a label switching router 1004 generates a new in label 411 replacing an old in label 410 and transmits a label switching control message to withdraw the outdated label to a label switching router 1002, label switching router 1002 will remove the out label 410 associated with a destination ID of 1 and a next hop of 4. According to various embodiments, the label switching control message to remove an outdated label is referred to herein as a label withdraw message.

Figure 12:
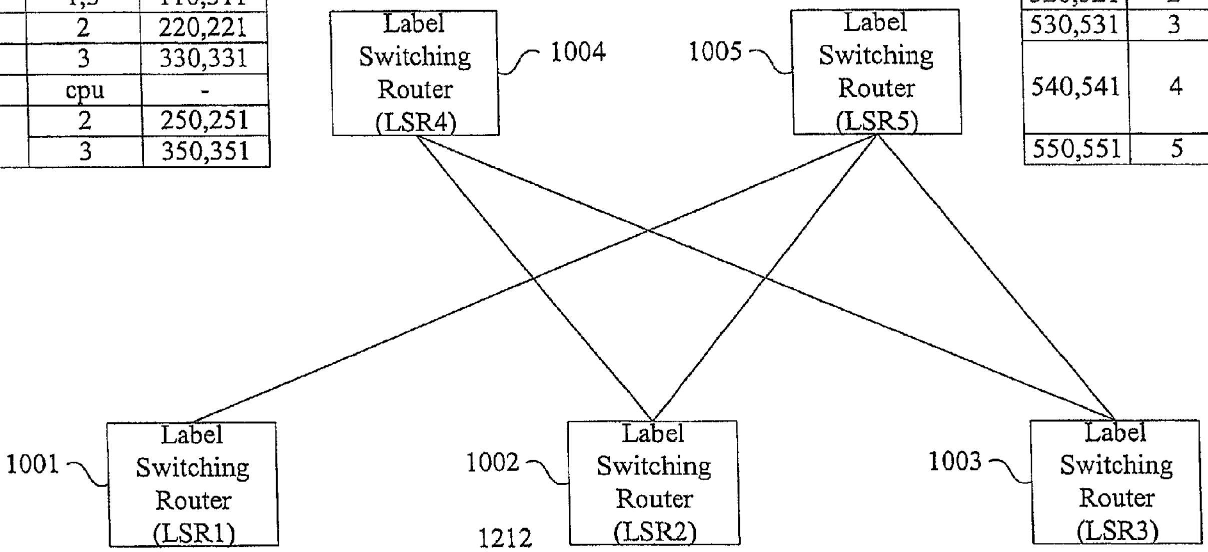
FIG. 12 is a diagrammatic representation of label switching routers while out labels are partially resolved.

While out labels are unresolved, fibre channel frames are dropped to prevent out of order delivery of fibre channel frames. In FIGS. 11 and 12, a "?" is used to indicate that a label is unresolved. For example, suppose label switching router 1005 transmitted frames 1 and 2 to label switching router 1001 in order to eventually reach label switching router 1004. After the failure of the link between label switching router 1001 and label switching router 1004, label switching router 1005 transmitted frames 3 and 4 to label switching router 1002 in order to eventually reach label switching router 1004. If frames 1 and 2 are not dropped, they could arrive at label switching router 1004 after frames 3 and 4. However, because the out label at label switching router 1001 for destination label switching router 1004 is not resolved after the link failure, frames 1 and 2 are dropped and frames 3 and 4 can arrive in order at label switching router 1004. In other words, because the out label 440 associated with destination 4 in the routing table 1111 is no longer accurate, frames 1 and 2 can be dropped.

To resolve the out labels, label switching router 1004 advertises the new in labels including in label 411 to other label switching routers such as label switching router 1002. The label switching control message to add a new label is referred to as a label mapping message. In one example, label switching router 1004 sends a label mapping message having a label to label switching router 1002. The label mapping message received at label switching router 1002 can instruct the label switching router 1002 to use the new in label 411 as the new out label associated with the next hop of 4 and the destination of 1.

FIG. 12 is a diagrammatic representation showing label switching routers in a fibre channel fabric where out labels are not yet completely resolved. Label switching router 1004 has generated a routing table 1214 that has replaced an old set of in labels 410, 420, 430, 440, and 450 with an updated stack of in labels 411, 421, 431, 441, and 451 respectively. The label switching router 1004 has also resolved its out labels and has replaced out labels 110, 110, 220, 330, 250, and 350, with new out labels 211, 311, 221, 331, 251, and 351, respectively. According to various embodiments, out labels are resolved at label switching router 1004 after the router 1004 has received from all other routers label mapping messages with topology version numbers corresponding to that of the routing table 1214.

Label switching router 1002, however, has not fully result out labels in routing table 1212. Although the routing table 1212 contains a new set of in labels, the set of out labels his only partially resolved. In particular, although the label switching router 1002 has new out labels corresponding to the next hop of 4, it does not have new out labels corresponding to the next hop of 5. This may have resulted from the receipt of a label mapping message from label switching router 1004 but no label mapping message from label switching router 1005. If the label switching router 1002 receives a frame for transmission to a next hop of 5, the frame is dropped because the out labels associated with the next hop of five are unresolved.

As link state update messages and label switch control messages are passed throughout the fibre channel fabric, every switch eventually can resolve the out labels in the same manner label switching router 1004 and label switching router 1001 have resolved the out labels in FIG. 12.

Figure 13:
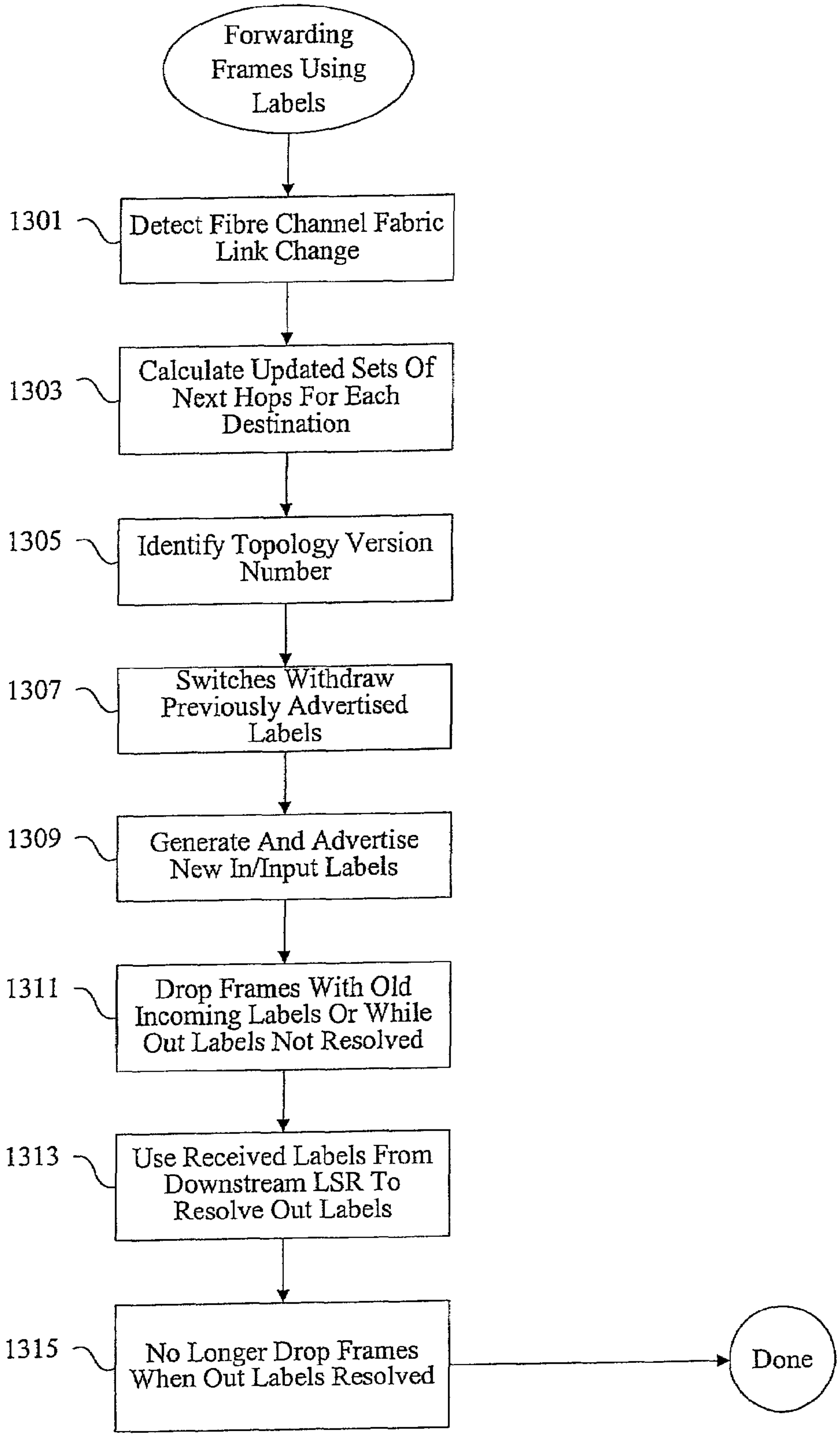
FIG. 13 is a process flow diagram showing techniques for in order delivery using input and outgoing labels.

FIG. 13 is a flow process diagram showing the forwarding of frames using labels. At 1301, a fibre channel fabric link changes detected. At 1303, updated sets of next hops for each destination are calculated based on link state information. According to various embodiments, the topology version number is identified at 1305. The topology version number can be a combination of the incarnation numbers of all of the switches in a fibre channel fabric. In one embodiment, the topology version number includes all of the incarnation numbers appended together. In another embodiment, the topology version number is a check sum of the various incarnation numbers. And in still another embodiment, the topology version number is a unique number meaningful to the switches in the network. At 1307, switches can transmit label switching control messages to withdraw previously advertised labels. At 1309, each label switching router can generate new in or incoming labels and advertise the new in or incoming labels to the other switches in the fabric.

It should be noted that the techniques of the present invention do not necessarily have to be performed in any particular order. For example, in one embodiment a label switching router can generate and advertise an in labels at the same time out labels are withdrawn at the other label switching routers.

At 1311, frames with old labels are dropped. Frames are also dropped while out labels are not resolved. For example, if the out labels associated with a next hop of six are not resolved, frames configured for transmission to a next hop of six are dropped. At 1313, out labels are resolved by using information from the label mapping messages or information from advertisements from the other label switching routers. Frames no longer are dropped, as out labels are resolved at 1315.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. Instructions such as quench messages can be sent at a variety of different times. It is therefore intended that the invention be interpreted to include all variations and equivalents that fall within the true spirit and scope of the present invention.

What is claimed is:

1. A method for selectively delivering frames in a fibre channel fabric, the method comprising:

detecting a fibre channel fabric link change at a fibre channel switch having a routing table;

generating an updated routing table associated with a topology version number, wherein generating the updated routing table comprises determining a next hop, an incoming label, and a destination corresponding to each entry in the updated routing table;

receiving a frame at the fibre channel switch, the frame having a first destination and a first label corresponding to a first entry in the updated routing table;

determining whether the fibre channel switch has received a first outgoing label having the same topology version number as the updated routing table, the first outgoing label corresponding to the first entry in the updated routing table; and dropping the frame if it is determined that the fibre channel switch has not received the first outgoing label.

2. The method of claim 1, wherein the first label is equivalent to a first incoming label associated with the first entry.

3. The method of claim 2, further comprising:

receiving a first link state control message having the first outgoing label and a topology version number corresponding to the topology version number of the routing table.

4. The method of claim 3, further comprising:

advertising the first incoming label to other switches in the fibre channel fabric.

5. The method of claim 1, further comprising:

forwarding the frame to the next hop if it is determined that the fibre channel switch has received the first outgoing label.

6. The method of claim 5, wherein the routing table is associated with a particular virtual storage area network.

7. The method of claim 6, wherein the topology version number is derived using incarnation numbers with each switch in the virtual storage area network.

8. The method of claim 7, wherein the input and outgoing labels are MPLS labels.

9. The method of claim 1, wherein the first label in the frame is contained in the fibre channel frame header.

10. An apparatus, comprising:

a processor operable to detect a fibre channel fabric link change at a fibre channel switch having a routing table and generate an updated routing table associated with a topology version number, wherein generating the updated routing table comprises determining a next hop, an incoming label, and a destination corresponding to each entry in the updated routing table;

an interface connected to the processor, the interface operable to receive a frame at the fibre channel switch, the frame having a first destination and a first label corresponding to a first entry in the updated routing table;

wherein the processor is further operable to determine whether the fibre channel switch has received a first outgoing label having the same topology version number as the updated routing table, the first outgoing label corresponding to the first entry in the updated routing table and drop the frame if it is determined that the fibre channel switch has not received the first outgoing label.

11. The apparatus of claim 10, wherein the first label is equivalent to a first incoming label associated with the first entry.

12. The apparatus of claim 11, further comprising:

receiving a first link state control message having the first outgoing label and a topology version number corresponding to the topology version number of the routing table.

13. The apparatus of claim 12, further comprising:

advertising the first incoming label to other switches in the fibre channel fabric.

14. The apparatus of claim 10, further comprising:

forwarding the frame to the next hop if it is determined that the fibre channel switch has received the first outgoing label.

15. The apparatus of claim 14, wherein the routing table is associated with a particular virtual storage area network.

16. The apparatus of claim 15, wherein the topology version number is derived using incarnation numbers with each switch in the virtual storage area network.

17. The apparatus of claim 16, wherein the input and outgoing labels are MPLS labels.

18. The apparatus of claim 10, wherein the first label in the frame is contained in the fibre channel frame header.

19. An apparatus, comprising:

means for detecting a fibre channel fabric link change at a fibre channel switch having a routing table;

means for generating an updated routing table associated with a topology version number, wherein generating the updated routing table comprises determining a next hop, an incoming label, and a destination corresponding to each entry in the updated routing table;

means for receiving a frame at the fibre channel switch, the frame having a first destination and a first label corresponding to a first entry in the updated routing table;

means for determining whether the fibre channel switch has received a first outgoing label having the same topology version number as the updated routing table, the first outgoing label corresponding to the first entry in the updated routing table; and means for dropping the frame if it is determined that the fibre channel switch has not received the first outgoing label.

20. The apparatus of claim 19, wherein the first label is equivalent to a first incoming label associated with the first entry.

21. The apparatus of claim 19, further comprising:

means for forwarding the frame to the next hop if it is determined that the fibre channel switch has received the first outgoing label.

* * * * *